US010519320B2

(12) United States Patent
Kronzer et al.

(10) Patent No.: US 10,519,320 B2
(45) Date of Patent: Dec. 31, 2019

(54) DURABLE, HEAT RESISTANT, ERASABLE RELEASE COATINGS, RELEASE COATED SUBSTRATES, AND THEIR METHODS OF MANUFACTURE

(71) Applicant: Neenah, Inc., Alpharetta, GA (US)

(72) Inventors: Frank J. Kronzer, Woodstock, GA (US); Stephen C. Lapin, Waterford, WI (US); Melanie K. Calkins, Marietta, GA (US); Gerry D. Rector, Johns Creek, GA (US)

(73) Assignee: Neenah, Inc., Alpharetta, GA (US)

( * ) Notice: Subject to any disclaimer, the term of this patent is extended or adjusted under 35 U.S.C. 154(b) by 75 days.

(21) Appl. No.: 14/299,365

(22) Filed: Jun. 9, 2014

(65) Prior Publication Data
US 2014/0287201 A1 Sep. 25, 2014

Related U.S. Application Data

(62) Division of application No. 13/213,134, filed on Aug. 19, 2011, now Pat. No. 8,758,548.

(51) Int. Cl.
| | | |
|---|---|---|
| *C09D 5/00* | (2006.01) | |
| *B29C 33/68* | (2006.01) | |
| *B32B 38/06* | (2006.01) | |
| *B29C 43/22* | (2006.01) | |
| *C09D 4/06* | (2006.01) | |
| *B32B 37/24* | (2006.01) | |
| *C08F 222/10* | (2006.01) | |
| *C08F 220/18* | (2006.01) | |

(52) U.S. Cl.
CPC ............... *C09D 5/00* (2013.01); *B29C 33/68* (2013.01); *B29C 43/222* (2013.01); *B32B 38/06* (2013.01); *C09D 4/06* (2013.01); *B32B 2037/243* (2013.01); *C08F 222/1006* (2013.01); *C08F 2220/1891* (2013.01); *Y10T 428/1476* (2015.01); *Y10T 428/24802* (2015.01); *Y10T 428/2817* (2015.01)

(58) Field of Classification Search
None
See application file for complete search history.

(56) References Cited

U.S. PATENT DOCUMENTS

| | | | | |
|---|---|---|---|---|
| 3,989,609 A * | 11/1976 | Brack | .................... | C08F 299/06 428/41.5 |
| 4,012,559 A * | 3/1977 | Fujioka | ................. | C08F 265/04 428/463 |
| 4,241,198 A * | 12/1980 | Kobayashi | ................ | C08F 8/42 156/289 |
| 4,288,479 A * | 9/1981 | Brack | .................... | C08F 299/06 427/147 |
| 4,311,766 A * | 1/1982 | Mattor | .................... | B29C 33/62 156/232 |
| 4,435,461 A * | 3/1984 | Gray | ......................... | B05D 1/40 427/156 |
| 4,863,781 A | 9/1989 | Kronzer | | |
| 5,242,739 A | 9/1993 | Kronzer et al. | | |
| 5,246,756 A * | 9/1993 | All | .............................. | C08J 3/03 428/352 |
| 5,425,991 A * | 6/1995 | Lu | ............................. | C09J 7/401 428/352 |
| 5,501,902 A | 3/1996 | Kronzer | | |
| 5,798,179 A | 8/1998 | Kronzer | | |
| 5,888,649 A * | 3/1999 | Curatolo | .................. | C09D 4/00 428/352 |
| 5,968,624 A * | 10/1999 | Liebe, Jr. | ................. | B44C 1/162 156/230 |
| 6,033,739 A | 3/2000 | Kronzer | | |
| 6,113,725 A | 9/2000 | Kronzer | | |
| 6,150,024 A * | 11/2000 | Dhoot | .................... | C08F 290/00 428/421 |
| 6,450,633 B1 | 9/2002 | Kronzer | | |
| 6,623,824 B1 | 9/2003 | Joseph et al. | | |
| 6,916,751 B1 * | 7/2005 | Kronzer | .................. | D06P 5/003 428/346 |
| 8,758,548 B2 * | 6/2014 | Kronzer | .................. | B29C 33/68 156/325 |
| 2002/0081420 A1* | 6/2002 | Kronzer | ................. | B41M 5/035 428/32.81 |
| 2002/0146544 A1* | 10/2002 | Kronzer | ............... | B41M 5/0256 428/32.79 |
| 2003/0152730 A1* | 8/2003 | Bradley | ................. | C09J 7/0246 428/40.1 |
| 2008/0102271 A1* | 5/2008 | Bilodeau | .............. | C09D 133/04 428/339 |

(Continued)

FOREIGN PATENT DOCUMENTS

| | | |
|---|---|---|
| CN | 101591486 | 12/2009 |
| KR | 2011065665 A | 6/2011 |
| WO | 2009005970 A1 | 1/2009 |

OTHER PUBLICATIONS

International Search Report for Appl. No. PCT/US2012/049249.

*Primary Examiner* — Anish P Desai
(74) *Attorney, Agent, or Firm* — Meunier Carlin & Curfman LLC

(57) ABSTRACT

Methods are generally disclosed for forming and using a release sheet. To form the release sheet, a release coating is applied over a first surface of a base sheet. Generally, the release coating includes a fatty alcohol ester of acrylic acid and a curable monomer, and can also include a curable polymeric resin. Then, the release coating can be cured. In one particular embodiment, the release coating can be substantially free from siloxanes. The release sheet formed according to this method is also generally provided, along with methods of forming a casting sheet using the release sheet are also generally provided.

8 Claims, 9 Drawing Sheets

(56) References Cited

U.S. PATENT DOCUMENTS

2009/0000727 A1* 1/2009 Kumar ................ C09J 7/0228
 156/230
2013/0045330 A1* 2/2013 Kronzer .............. D21H 27/001
 427/146

* cited by examiner

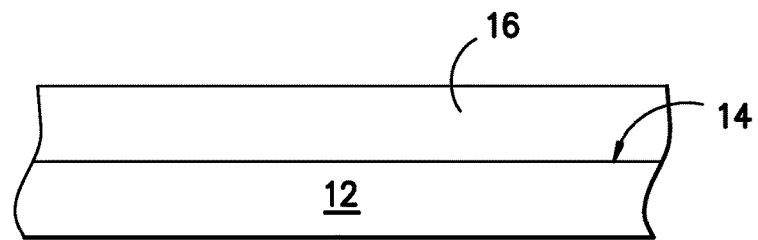
FIG. -1-
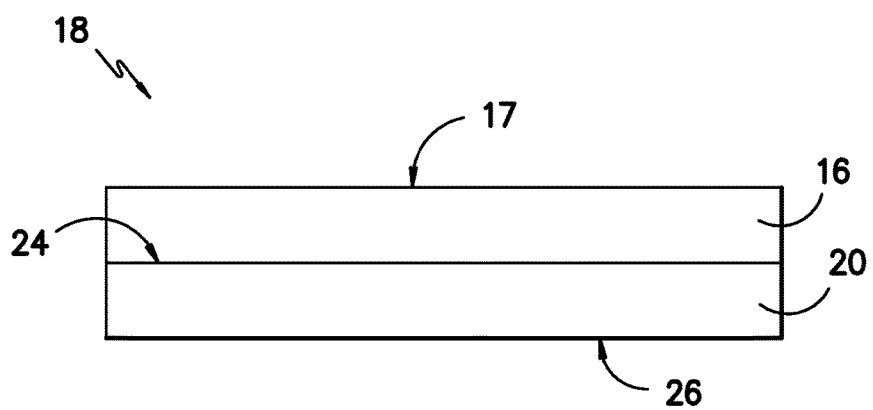
FIG. -2-

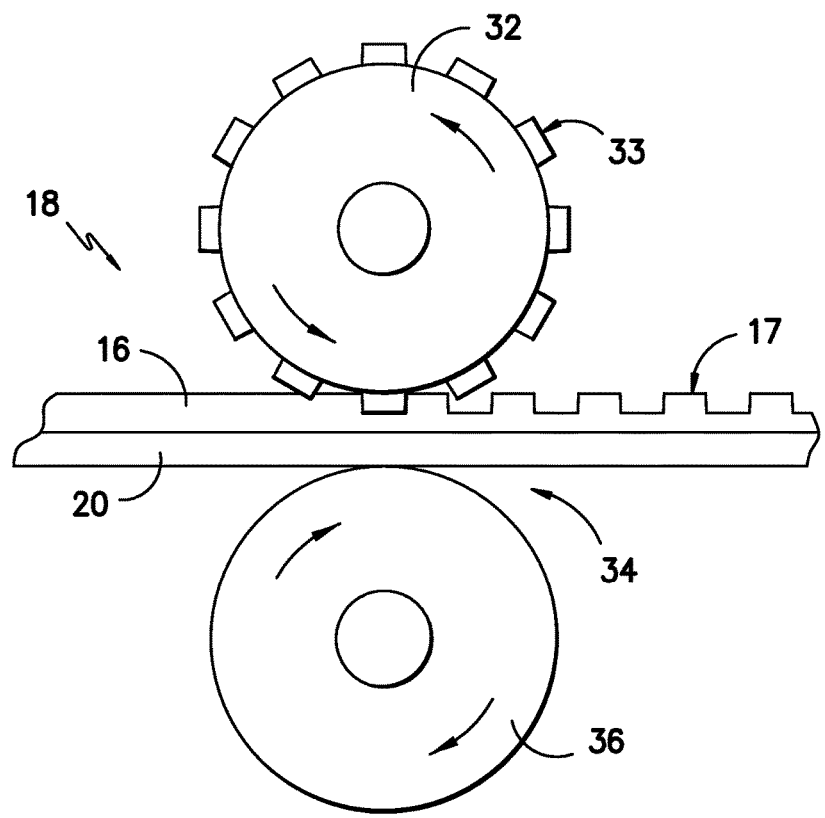
FIG. -3-
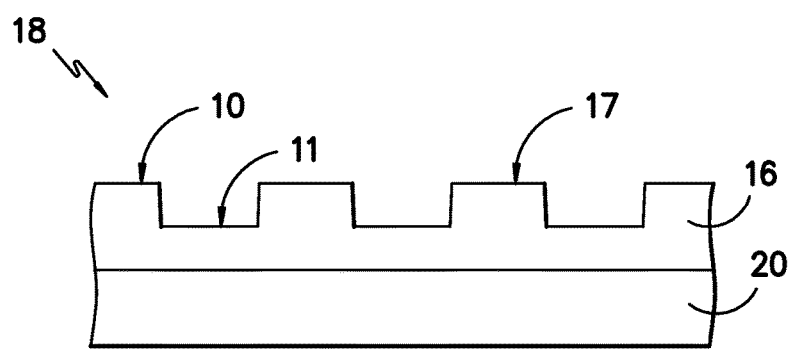
FIG. -4-

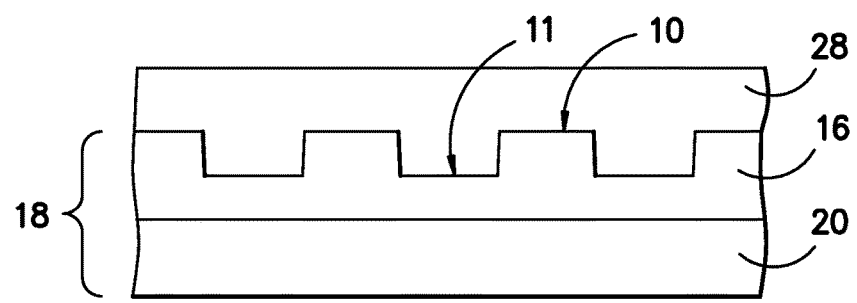
FIG. -5-
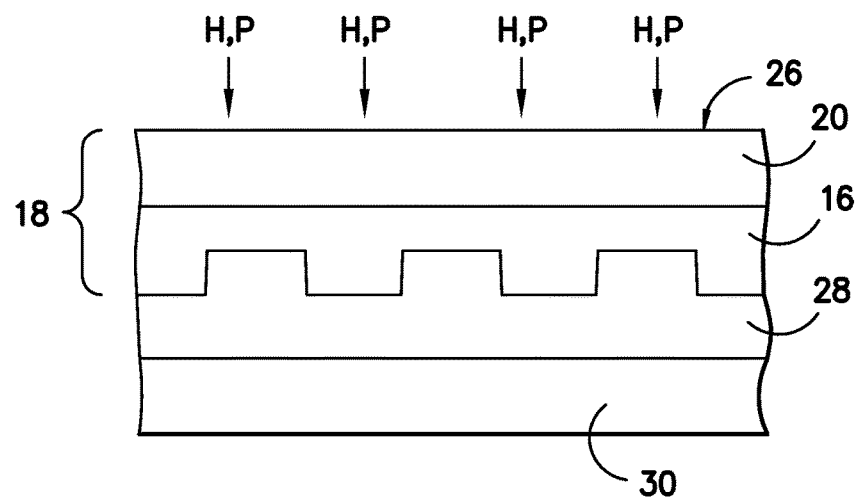
FIG. -6-

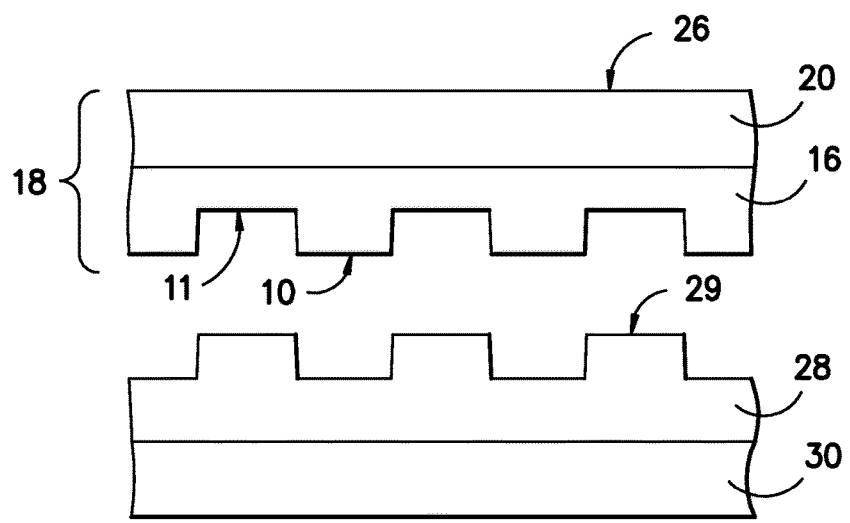
FIG. -7-
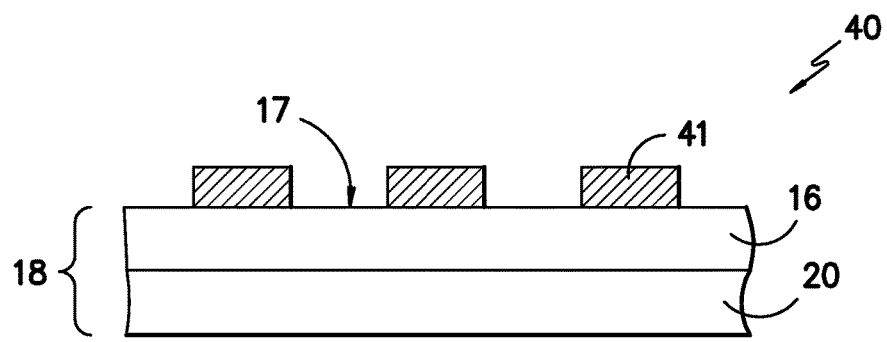
FIG. -8-

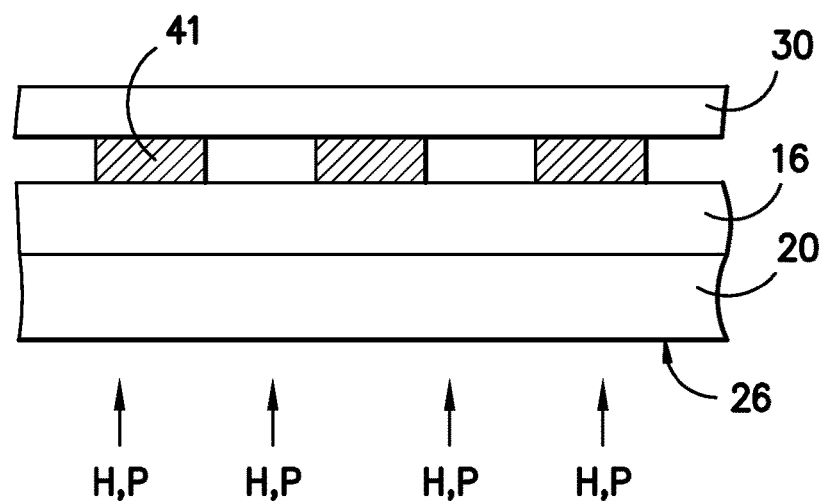
FIG. -9-
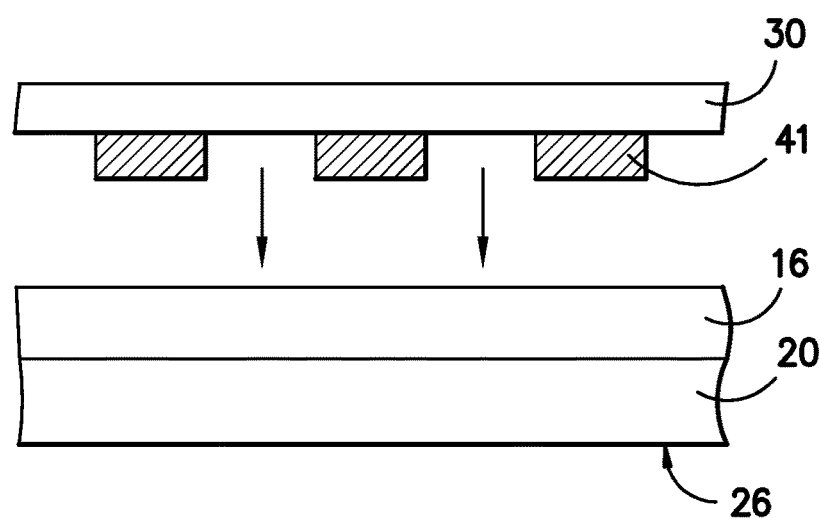
FIG. -10-

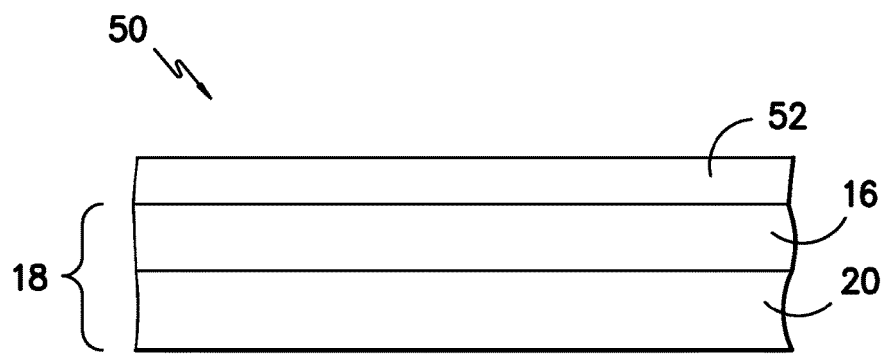
FIG. -11-
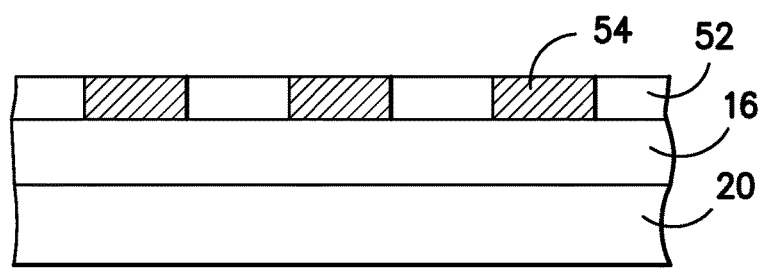
FIG. -12-

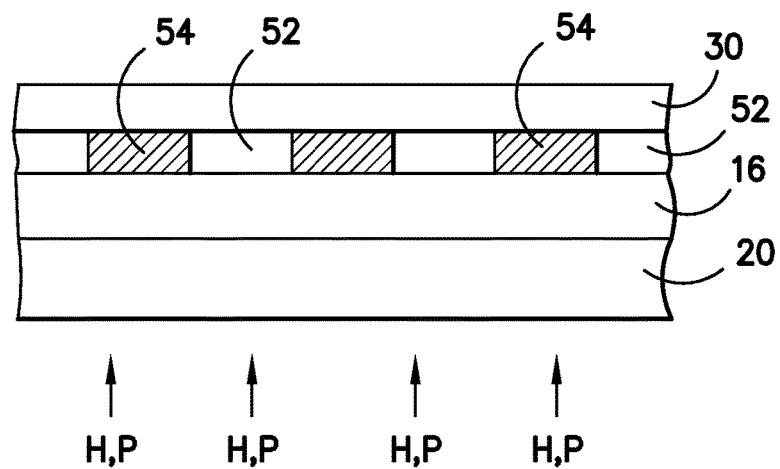
FIG. -13-
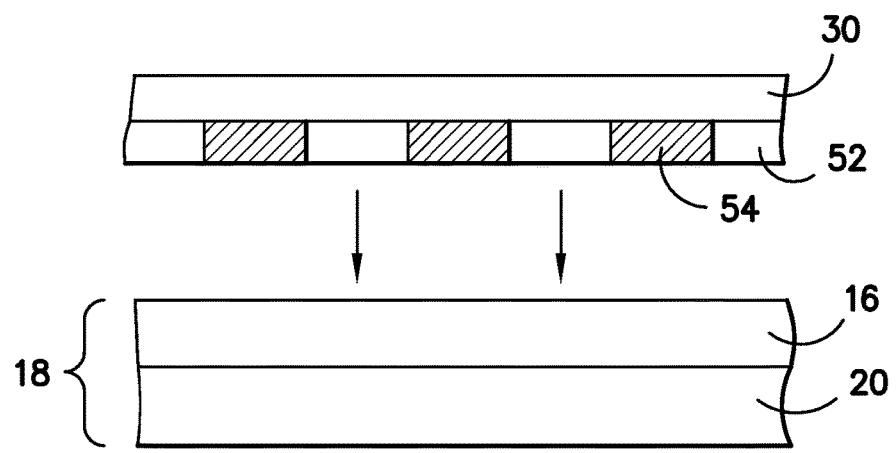
FIG. -14-

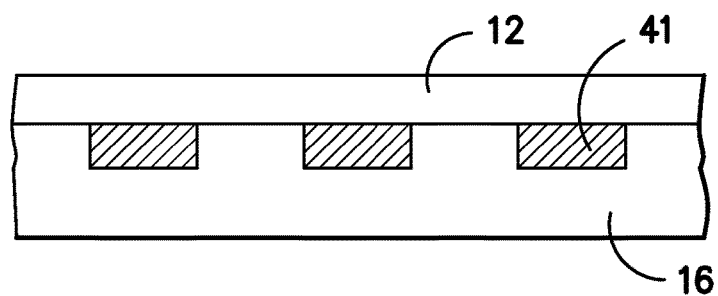
FIG. -15-
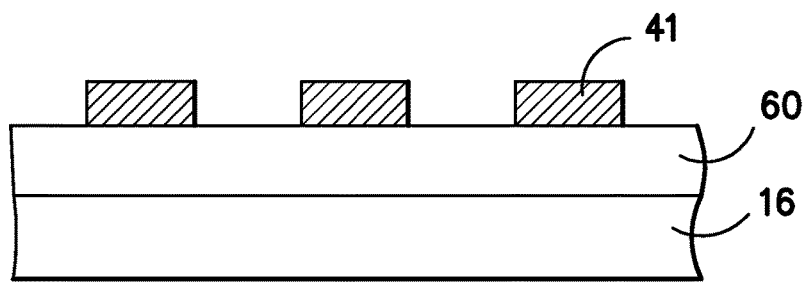
FIG. -16-
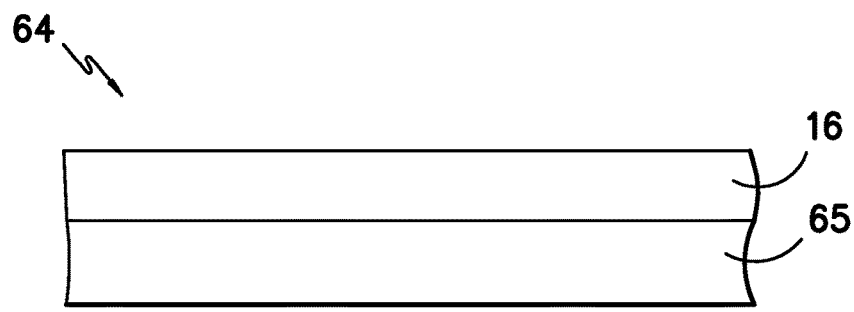
FIG. -17-

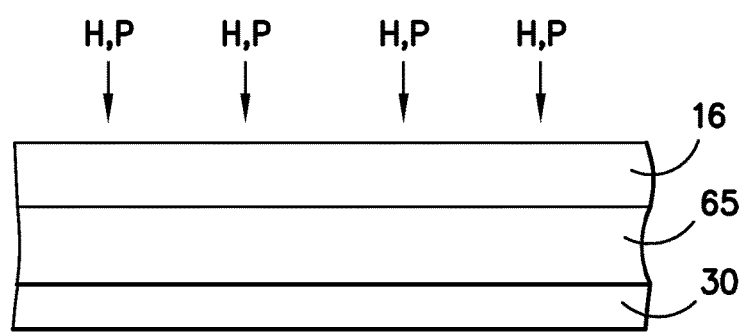
FIG. -18-

DURABLE, HEAT RESISTANT, ERASABLE RELEASE COATINGS, RELEASE COATED SUBSTRATES, AND THEIR METHODS OF MANUFACTURE

PRIORITY INFORMATION

The present application claims priority to, and is a divisional application of, U.S. patent application Ser. No. 13/213,134 titled "Durable, Heat Resistant, Erasable Release Coating, Release Coated Substrates, and Their Methods of Manufacture" of Kronzer, et al. filed on Aug. 19, 2011, which is incorporated by reference herein.

BACKGROUND OF THE INVENTION

Release coatings used in durable, stain resistant, heat resistant or erasable materials as well as in release papers typically include silicone containing materials or other release agents to provide the release properties. However, the silicone groups, and particularly siloxane groups (e.g., PDMS, organo-silicones, reactive silicones like acrylate functional materials, etc.), in typical silicone release coatings can lead to severe contamination problems. Since the typical siloxane release agents in coatings are present as low molecular weight materials before curing, at this stage they are not anchored into the coating and can transfer to coating equipment and then to other materials subsequently processed on the equipment. The siloxane release agents have a low surface tension and low viscosity and thus tend to easily spread onto the equipment and then onto other materials processed on the equipment. This contamination is difficult to remove and contaminated materials such as films or papers contaminated with the siloxanes have very low surface energy spots which cause voids in coatings applied to them and poor adhesion of coatings, inks or adhesives. Once the coatings are cured, the siloxanes should be firmly anchored; however, the cured silicone release coatings have another disadvantage: in certain applications, it is desirable to apply inks or other coatings onto the release coatings and then remove such inks or coatings sometime later. For example, one might want to apply a coating or an ink to the release coating and then transfer the coating or ink to another material such as a garment at a later date, or one might want to use the release coating as an erasable substrate. However, due to the very low surface energy of typical siloxane containing release coatings, subsequently applied coatings or inks will not spread evenly and tend to bead on the surface. Additionally, coatings containing silicone release agents cannot be conveniently coated with water based acrylic or polyurethane polymers due to the low surface energy of these release coatings.

Although siloxane containing release coatings do pose problems, they are very effective and their effectiveness in many applications has not been matched by other types of release coatings. Thus, a need exists for effective durable, heat resistant and erasable release coatings which contain no siloxane release agents. Additionally, a need exists for release coatings which can be effectively printed or over coated with inks or coatings which are subsequently removable. Also, there is a need for durable, graffiti resistant and erasable materials. In addition, heat transfer papers and heat transfer decals which have internal release coatings and releasably attached polymeric coatings, such as polyurethane and acrylic polymer coatings, are desired for transfer of durable, stretchable graphics and also for transfer of textures.

SUMMARY OF THE INVENTION

Aspects and advantages of the invention will be set forth in part in the following description, or may be obvious from the description, or may be learned through practice of the invention.

To form a release coated substrate, the release coating can be applied over a first surface of a substrate. Generally, the release coating includes a fatty alcohol ester of acrylic acid (e.g., lauryl acrylate) and a curable monomer (e.g., trimethylolpropane triacrylate). In certain embodiments, a curable polymeric resin can also be included in the release coating. Then, the release coating can be cured (e.g., via exposing the release coating to e-beam radiation). The release coating can be substantially free from siloxane release agents (e.g., substantially free from release agents having siloxane groups).

The release coated substrate formed according to this method is also generally provided. Also provided are release sheets with heat transferrable images, heat transfer papers with a print coating overlaying a release coating, and a paper or film useful for casting of thermoplastic coatings onto substrates such as leather and fabrics.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1 shows a release coated substrate with an exposed release coating according to one exemplary embodiment of the present invention;

FIG. 2 shows a release sheet including a base sheet with an exposed release coating according to another aspect of this invention;

FIG. 3 shows formation of a patterned release surface of a release coating overlying a back sheet and conforming to the patterned surface of a forming roll during cure of the release coating to form a patterned release substrate;

FIG. 4 shows the release sheet of FIG. 2 having a patterned surface;

FIG. 5 shows a thermoplastic layer applied over the release sheet of FIG. 4;

FIGS. 6-7 sequentially show an exemplary heat transfer for transferring the thermoplastic layer of FIG. 5 to a substrate;

FIG. 8 shows a heat activate-able image applied to the release paper of FIG. 2;

FIGS. 9 and 10 sequentially show transfer of the heat activate-able image of FIG. 8 to a substrate;

FIG. 11 shows a meltable print coating applied to the release paper of FIG. 2;

FIG. 12 shows an image printed onto the print coating of FIG. 11;

FIGS. 13 and 14 sequentially show transfer of the printed image of FIG. 12 to a substrate;

FIG. 15 shows an erasable paper with a printed image on one surface of the paper and a release coating overlying the printing;

FIG. 16 shows an erasable translucent paper with a printed image on one side and a release coating on the other side;

FIG. 17 shows a heat sealable protective substrate with a heat sealable adhesive on one side and a release coating on the other side; and FIG. 18 shows the application of the heat sealable protective substrate of FIG. 17 to a substrate.

Repeat use of reference characters in the present specification and drawings is intended to represent the same or analogous features or elements of the present invention.

Definitions

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

In the present disclosure, when a layer is being described as "on" or "over" another layer or substrate, it is to be understood that the layers can either be directly contacting each other or have another layer or feature between the layers (unless otherwise stated). Thus, for example as shown in the figures and described in the accompanying descriptions, these terms are simply describing the relative position of the layers to each other and do not necessarily mean "on top of" since the relative position above or below depends upon the orientation of the structure to the viewer.

In this discussion, the term "release coating" indicates a coating which has release properties for a number of materials and is durable. A material which "has release properties for a second material" means here that the second material can be removed from the first, release material, easily and without damage to either the release material or the second material.

An "erasable" material refers to a material which will accept ink, but allows the ink to be removed without substantial damage to the material.

A "graffiti resistant material" means that the material can be cleaned after it has been defaced by ink, paint, lipstick, food and other materials which might otherwise cause permanent defacement.

The term "substrate" refers a material to which coatings can be applied and, as such, encompasses a wide variety of materials.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

Generally speaking, coating compositions which contain no siloxane release agents and which can be applied to a variety of substrates, then cured to form durable, heat resistant release surfaces on these substrates are provided. Additionally provided are release papers, casting papers, erasable papers and printable heat transfer papers. Also provided are durable, graffiti resistant surfacing materials which can be bonded to surfaces not conveniently coated with the curable release coatings.

In various embodiments, the coating can be applied to substrates which then function as durable materials, heat resistant release substrates, graffiti resistant materials, erasable materials, stain resistant materials and heat transfer materials.

Methods are also generally disclosed for using the release coating on a number of substrates for many applications. These include release papers for application and transfer of graphics, release papers and films for release of pressure sensitive labels and tapes and erasable films and papers for toys, games, posters and note pads and also durable, easily cleanable coatings on items such as floors, table tops, wall panels and the like. In many applications, the coating can be applied directly to the substrate. In cases where this is not convenient, it is envisioned that the coating can be applied to a film or paper with a heat activated adhesive or a pressure sensitive adhesive which can then be bonded to a second substrate which is not conveniently coated directly.

The high heat resistance and reusable qualities of the release coating stem from a highly crosslinked polymeric material formed upon curing the release coating. The release coating generally includes a fatty alcohol ester of acrylic acid, a curable polymeric resin, and a curable monomer. Additionally, materials which are useful in mixing and applying the coatings such as defoamers, rheology control agents, fillers and surfactants may be employed if needed in the coating process provided that such materials do not materially affect the critical surface tension of the cured coatings or the release properties. Also, some of these useful additives used in small amounts to control the above processing properties may contain siloxane groups, provided that they are not siloxane release agents.

The release coating can contain from about 5% to about 60% of an acrylic acid ester of a fatty alcohol, also called a long chain hydrocarbon alcohol. Without wishing to be bound by any particular theory, it is believed that the fatty alcohol ester of acrylic acid provides release properties to the release layer without the addition or presence of silicone polymers or other release agents (eg. waxes etc.).

In one particular embodiment, the release coating is substantially free from siloxane release agents, such as substantially free from release agents having siloxane groups. As used herein, the term "substantially free" means no more than an insignificant trace amount present and encompasses completely free. For example, in one embodiment, the release coating can consist essentially of the fatty alcohol ester of acrylic acid, the cured polymeric resin, and the curable monomer such that the release coating is substantially free from other compounds.

Without wishing to be bound by any particular theory, it is believed that the absence of siloxane release groups in the release coating allows the release coating to be over coated with water-based and other relatively high surface tension coatings without defects caused by poor wetting; yet will allow these coatings to release easily from the release coating, even after being subjected to pressure and heating to 375° F. or higher. One way to measure the ease of wetting surfaces with a liquid is to spread a liquid of known surface tension on the surface, then observe whether the liquid forms a continuous film on the surface or separates into droplets. For example, one may use Accu Dyne® test pens from Diversified Enterprises (Claremont, N.H.), who provide a set of pens with a range of surface tensions. The "critical surface energy" of the surface is equal to or nearly equal to the surface tension of the lowest surface tension liquid which wets evenly. Thus, liquids with a surface tension less than about the measured critical surface energy will wet the surface evenly.

The fatty alcohol ester of acrylic acid generally includes an acrylic group attached via an ester linkage to a hydrocarbon chain. The acrylic group is generally polymerizable and can include an acrylic moiety, a methacrylic moiety, etc. The hydrocarbon chain of the fatty alcohol can be of any length, such as comprising from about 8 to about 26 carbons, for example from about 12 to about 22 carbons. Alternatively, in other embodiments, the hydrocarbon chain can comprise from about 18 carbons to about 26 carbons. For instance, in one particular embodiment, the fatty alcohol can have a hydrocarbon chain of 18 carbons.

The hydrocarbon chain on the fatty alcohol ester of acrylic acid can be either saturated or unsaturated including both monounsaturated and polyunsaturated fatty alcohols. A saturated carbon chain means that all the carbon to carbon bonds in the hydrocarbon chain are single bonds, allowing the maximum number of hydrogen atoms to bond to each carbon, thus the chain is "saturated" with hydrogen atoms. An unsaturated hydrocarbon chain means that the carbon chain contains at least one carbon to carbon double bond, thereby reducing the number of hydrogen atoms present on the chain. A monounsaturated hydrocarbon chain contains one carbon to carbon double bond, while a polyunsaturated hydrocarbon chain contains at least two carbon to carbon double bonds.

Many fatty alcohol chains have common names, relating to their corresponding hydrocarbon chain, to describe the chain. The hydrocarbon chains can also be described by the number of carbon atoms present in the chain and the number and location of any double bonds present in the chain, represented by $x{:}y^{\Delta p, p', p''}$, where x is the number of carbons in the hydrocarbon chain, y is the number of carbon to carbon double bonds in the chain, p is the location of the first double bond (if present), p' is the location of the second double bond (if present), p" is the location of the third double bond (if present), and so on.

In one particular embodiment, the fatty alcohol ester of acrylic acid can include a saturated hydrocarbon chain. Examples of saturated fatty alcohols that can be used as the fatty alcohol ester of acrylic acid include, but are not limited to, lauryl alcohol (12:0), tridecyl alcohol (13:0), myristil alcohol (14:0), pentadecyl alcohol (15:0), cetyl alcohol (16:0, also known as palmityl alcohol), heptadecyl alcohol (17:0), stearyl alcohol (18:0), arachidyl alcohol (20:0), and behenyl alcohol (22:0).

For example, the fatty alcohol ester of acrylic acid with a saturated hydrocarbon chain can generally be defined by Formula 1:

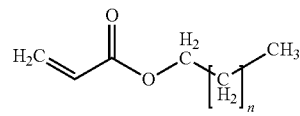

Formula 1 where n is an integer between 6 and 20. As such, the hydrocarbon chain can have a total length of 8 to 22 carbons. For example, when n is 10, the resulting compound shown in Formula 1 is lauryl acrylate.

The relative amounts of the components (i.e., the fatty alcohol ester of acrylic acid, the curable polymeric resin, and the curable monomer) can be adjusted to form the desired release properties in the release coating. However, in one particular embodiment, the release coating can include the fatty alcohol ester of acrylic acid in an amount of about 5% to about 50% by weight of the release coating prior to curing (e.g., about 10% to about 25% by weight). The release coating can include the curable polymeric resin in an amount of about 0% to about 80% by weight of the release coating prior to curing (e.g., about 30% to about 50% by weight). The release coating can include the curable monomer in an amount of about 15% to about 60% by weight of the release coating prior to curing (e.g., about 30% to about 50% by weight).

The curable monomer is selected to react with the curable polymer and the fatty alcohol ester of acrylic acid to form a highly crosslinked release coating. For example, the curable monomer can include trimethylolpropane triacrylate (TMPTA), which is a trifunctional monomer with a relatively low volatility and fast cure response. Due to the trifunctionality of this monomer, the resulting cured polymeric material is highly crosslinked, resulting in high heat resistance and a durable release coating.

The curable polymers may include, but are not limited to, epoxy acrylates, polyurethane acrylates, polyester acrylates and other curable resins with double bonds (e.g., vinyl moieties). It is understood that the multifunctional monomers in these formulations are required to provide crosslinking which imparts heat resistance, solvent resistance and durability. The amount of crosslinking increases as the equivalent weight of the monomer decreases and as the number of reactive sites per molecule increases. It is probable that only about 10% of very efficient monomers such as tetrafunctional monomers would be needed, whereas up to 80% of some of the high equivalent weight difunctional monomers may be required.

Curable resins in these release coating formulations can provide increased viscosity before curing and attributes in the cured coatings such as flexibility, hardness, toughness, weather resistance etc. The increased viscosity is desirable for coating of relatively porous materials, since more viscous coatings will remain on the surface for a longer time (eg. until the coating is cured). The percentage of curable resin, such as Ebecryl37-20T, needed in the present formulations is anticipated to be zero or near zero if the substrate is not porous.

The release coating is cured after application to its support material (e.g., the substrate or a base sheet, as discussed in greater detail below). Curing generally transforms the curable polymeric resin into a highly crosslinked layer configured to withstand multiple heating and pressing cycles encountered during repeated use as a casting paper, as well as repeated steps of marking the paper and erasing in erasable applications and resistance to stains and solvents in graffiti resistant and durable applications.

In one embodiment, the release coating can be cured via a non-thermal curing process. For example, the release coating can be exposed to an e-beam curing process or an UV curing process. Electron beam (e-beam) curing is a non-thermal curing process that generally involves exposing the curable material to a stream of electrons (e.g., using a linear accelerator). UV curing is a non-thermal curing process that generally involves exposing the curable material to electromagnetic radiation having a wavelength in the ultraviolet range (e.g., about 10 nm to about 400 nm). The curing process can be configured to produce the desired degree of crosslinking in the release coating by altering the amount of energy supplied to the cured layer (e.g., by adjusting the time the release coating is exposed to the curing process). The release coating may also be cured in a thermal process. If thermally cured, a thermal cure initiator is needed. This is generally a chemical which produces free radicals when heated.

If desired, the release coating may be dispersed or dissolved in an organic solvent or water. The coating is then dried before curing by means of, for example, steam-heated drums, air impingement, radiant heating, or some combination thereof.

The release coating may have a layer thickness selected according to the use of the coated substrate. For applications requiring only release properties and durability, the thickness can be only 1 to 10 microns. However, if desired, as, for example, in the case of patterned casting applications, the coating can be up to 150 microns thick (as thick as is needed to control the amount of texturing to be formed in the thermoplastic layer on the final substrate). For most applications, the release coating has a thickness of about 1 µm to about 35 µm.

The release coating requires curing to convert it into a highly crosslinked structure needed for release properties and durability. Curing via an electron beam requires no more components in the coating other than the fatty alcohol ester of acrylic acid and the curable monomer, although some curable resin such as an epoxy acrylate resin is desirable. No initiator is required for electron beam curing since free radicals which initiate the curing are generated when the electrons collide with the materials in the coating. As is well known in the art of formulating UV curable coatings, a photoinitiator is required if the coating is to be cured with UV radiation. The photoininiator produces free radicals when it absorbs ultraviolet light. For thermal curing, as is well known in the art formulating thermally curable coatings, an initiator which forms free radicals when heated is required.

As stated, the release coatings can be utilized with a variety of substrates and application methods.

I. Release Coated Substrates

Referring to FIG. 1, a substrate 12 is shown having a release coating 16 on its surface 14. The release coating 16 contains a cured coating derived from at least a fatty alcohol ester of acrylic acid and a second curable monomer, and desirably includes a cured resin, as discussed above.

The substrate 12 can include any article in which one wants to protect from applied compositions including, but not limited to, stains, graffiti, paints, inks, food, adhesives and other materials which would deface the article. The substrates 12 include, but are not limited to, flooring, wall panels, furniture, furniture components, food packages, cooking containers and erasable films and papers which can be used, erased and used again.

Methods of applying the release coating 14 will depend mainly on the substrate 12 and include, but are not limited to gravure, offset gravure, flexographic press, offset press, roll, air knife, brush, meyer rod, silk screen and roller. For example, as is well known in the art, flat, uniform materials such as paper and film can be readily coated with gravure, offset gravure, wire wound rod, air knife, offset lithographic press, and air knife methods. Materials which are not readily rolled up such as furniture panels, glass panels, wall panels, wood and furniture components can be coated with a brush, spray, roller, or a silk screen.

The curing method employed also depends on the nature of the substrate 12. For example, many low melting materials such as plastics cannot be cured conveniently with heat, whereas heat or UV curing is better for materials which require a portable curing unit. (Electron beam curing units are large and not easily transported so they are better suited to curing of materials which can be transported to them, such as materials wound into rolls.) Also, as mentioned above, UV curing requires a photoinitiator in the coating and thermal curing requires a thermally initiated curing agent in the coating.

II. Release Coated Sheets

Referring to FIG. 2, a release sheet 18 is shown including a base sheet 20 (e.g., a paper, film, etc.) having a cured release coating 16 on its first surface 24. The release coating 16 contains at least a cured fatty alcohol ester of acrylic acid a second cured monomer and desirably contains a cured resin such as an epoxy ester resin, as discussed above. In certain embodiments, the release coating 16 generally does not melt or become tacky when heated. This quality is especially useful for applications such as casting papers and cooking papers which are subjected to heat.

A variety of methods may be used to apply the release coating 16 to the base sheet 20. Curing may be done in a thermal process, via UV radiation or via electron beam radiation. No initiator is needed for the electron beam curing; a photoinitiator is needed for UV curing whereas a thermally initiator is needed for thermal curing. The release paper or film can be used in a wide variety of applications, included, but not limited to, release liners for pressure sensitive adhesives, release papers and films for composites (such as epoxy/carbon fiber composites), release papers or films which can be coated with adhesives on the backside to form tapes, release papers for food wrapping and cooking and films and papers for casting of thermoplastics.

FIG. 2 generally includes a base sheet 20 that acts as a backing or support layer. The base sheet 20 is flexible and has a first surface 24 and a second surface 26. For example, the base sheet 20 can be a film or a cellulosic nonwoven web. In addition to flexibility, the base sheet 20 also provides strength for handling, coating, sheeting, other operations associated with the manufacture thereof, and for removal after embossing. The basis weight of the base sheet 20 generally may vary, such as from about 30 to about 150 g/m². Suitable base sheets 20 include, but are not limited to, cellulosic nonwoven webs and polymeric films. A number of suitable base sheets 20 are disclosed in U.S. Pat. Nos. 5,242,739; 5,501,902; and 5,798,179; the entirety of which are incorporated herein by reference.

Desirably, the base sheet 20 comprises paper formed from a cellulosic material. A number of different types of paper are suitable for the present invention including, but not limited to, litho label paper, publication paper, and barrier coated latex saturated papers. Penetration of the release coating 16 into the base sheet 20 is generally not desirable since a thicker coating would then be needed in order to form a continuous release coating surface. Thus, the porosity of the base sheet 20 before coating should be very low. The Sheffield porosity measurement is useful determining how well the substrate will hold a coating on the surface. In this technique, air is forced through a given area of the substrate and the flow rate of the air which passes through is measured in cubic centimeters per minute. Papers with Sheffield porosities less than 25 are therefore preferred. Generally, this low porosity is not obtainable in papers unless they are coated, but most films and coated papers are sufficiently non-porous for application of the release coatings. The base sheet 20 is readily prepared by methods that are well known to those having ordinary skill in the art.

The release coating 16 is coated over the first surface 24 of the base sheet 20, and coated such that substantially all of the first surface 24 is covered by the release coating 16.

III. Casting Papers

In one particular embodiment embodiment, the release coating 16 is cured while being held against a forming roll such that surface 17 of the release paper 16 retains the shape imparted by the forming roll after it is cured. For example, the release coating 16 may be patterned in order to impress a pattern into thermoplastic materials in a casting process.

Referring to FIG. 3, for example, the release coating 16 can be applied to the base sheet 20. The uncured release coating 16 can then be pressed against a patterned surface 33 of a forming roll 32 while it is cured (e.g., shown as a nip 34 formed between the patterned forming roll 32 and the pressure roll 36). As such, a patterned surface 17 is formed in the cured release coating 16 on the base sheet 20, as shown in FIG. 4. As shown, the patterned surface 17 defines a series of peaks 10 and valleys 11 to impart a texture; however, any pattern, design, image, etc. can be formed in this manner.

In one particular embodiment, the patterned release sheets 18 can be used as casting papers for transfer of thermoplastic or thermoset coatings to substrates such as cloth and leather. Such thermoplastic coatings provide desired appearances as well as durability to these and similar substrates. Referring to FIG. 5, the release sheet 18 of FIG. 4 (called a casting paper in this use) is coated with a thermoplastic coating 28 (e.g., polyvinyl chloride, a polyurethane, etc.).

FIGS. 6 and 7 depict transfer of the thermoplastic coating 28 to a substrate 30. Specifically, the thermoplastic coating 28 is placed adjacent to the substrate 30 (i.e., in direct contact), and heat (H) and pressure (P) are applied to the second surface 26 of the base sheet 20. Accordingly, the thermoplastic coating 28 melts and attaches to the substrate 30, while retaining a patterned surface 29 that is a mirror image to the patterned surface 17 of the release coating 16. The release sheet 18, via its release properties of the release coating 16, then can be peeled from the thermoplastic coating 28. In this use, good release of the thermoplastic coating, heat resistance and durability of the casting paper 18 and the release coating 16 are needed, especially if the casting paper is subjected to more than one use cycle.

In the casting process, the surface of the final substrate 30 becomes coated with the thermoplastic polymer 28 and the thermoplastic polymer 28 retains the shape imparted to it by the casting paper 18. Thus, the casting paper 18 becomes a template to transfer patterns to the final substrate 30. In this use, the patterned release coating must release the thermoplastic material, and must be heat resistant in order to retain its shape under heat and pressure, thus imparting the shape or pattern to the final substrate. The durability of the highly crosslinked coatings containing the cured acrylic acid esters of fatty alcohols, a second cured monomer and, optionally, a cured resin, is highly desired in this use.

In another embodiment, the release sheet 18 shown in FIG. 2 can be utilized to form a smooth and/or glossy surface on the substrate. As such, the surface 17 of the release coating 16 can be substantially smooth (e.g., conforming to the first surface 24 of the base sheet 16). In this embodiment, the smoothness of the base sheet 20 used in casting release materials can be critical, especially if the casting material is to be used to impart a smooth or glossy surface. As a general rule, it is easy to understand that the first surface 24 of the base sheet 20 should be about as smooth or smoother than the smoothness desired in the final coated substrate 20. Surface smoothness can be measured by various methods. One method is the Sheffield method. In this method, a circular rubber plate or gasket with a hole in the center is applied with a specified pressure to the substrate. Air is forced under a specified pressure into the center hole and the air flow resulting from air escaping from under the gasket is measured. The higher the air flow, measured in milliliters per minute, the rougher the substrate. For many casting applications, papers such as clay coated papers with Sheffield smoothness less than about 100 are smooth enough, while very fine castings may require smoother substrates with Sheffield smoothness of around 10 or less. Base sheets with patterns such as embossed base sheets are also useful since, after release coating, they can be used to impart patterns to the final substrate.

Casting papers as described above can also be used to impart patterned surfaces to thermoplastic materials, such as PETG panels. (PETG is a glycol modified polyethylene terephthalate, a hard thermoplastic.) The patterned plastic items can then be used for decorative wall panels, furniture surfaces and coverings for instruments, appliances etc. The release coatings of FIG. 2, having cured fatty alcohol esters of acrylic acid in a highly crosslinked structure, are very useful in the above casting processes due to their release properties, durability and heat resistance.

IV. Heat Transfer Decals

Referring to FIG. 8, a heat transfer decal 40 is shown having an image 41 applied to the release coating 16 on the base sheet 20 of the release sheet 18 of FIG. 2. The image 41 may be white or colored, and melts or becomes tacky when heated, thus adhering to a desired substrate (e.g., a fabric, such as a garment). The decal image 41 can contain a dye or pigment, a polymer and optionally a plasticizer. For example, it may be a colored polyvinylchloride plastisol or pigmented polyurethane.

The image 41 is preferably applied with a silk screen but other methods of application can be employed, including but not limited to, flexographic printing and offset lithography. Screen printing is often used to apply polyvinylchloride plastisol images, as is known to those skilled in the art. These plastisols are dispersions of a polyvinylchloride resin in a plasticizer which are liquids when applied but which solidify when heated due to interaction of the resin and plasticizer when the heat softens the resin. For example, the polyvinylchloride image 41 can be applied to the release surface 17 of release sheet 18 of FIG. 2 and heated to solidify the plastisol.

Subsequently, the decal 40 can be pressed onto a substrate 30 using heat (H and pressure (P), resulting in transfer of the decal image 41 to the substrate 30, as depicted sequentially in FIGS. 9 and 10.

Alternatively, the decal 40 can be printed via a flexographic, silk screen or other well known printing method as a coating 41 of pigmented or dyed resin such as a polyurethane resin dispersed in water or dissolved in an organic solvent. After drying, the decal is not tacky until it is heated and thus can be used when desired to transfer the images with heat and pressure to substrates 30 such as leather or garments.

In these heat transfer decals, as is well known to those skilled in the art, the image 41 is applied in the form of a mirror image, which becomes a "right reading" image after transfer. Also, in the uses described above, the release coating of FIG. 2 provides a printable release surface for the heat sensitive decal inks due to its relatively low critical surface tension (compared to siloxane coatings) which allows for good wetting of the surface. Also, this highly crosslinked coating containing the cured acrylic acid ester of a fatty acid, the cured second monomer and the desired cured resin provides release of the decals even after heating to temperatures of 375° F. or higher.

V. Printable Heat Transfer Papers

Referring to FIG. 11, heat transfer sheet 50 is shown having a printable heat transfer coating 52 overlying the release surface 16 of the release sheet 18 of FIG. 2. The printable heat transfer coating 52 may be fashioned to be printable by a variety of methods including but not limited to ink jet printing, laser printing and offset lithography. When subjected to heat and pressure, the printable heat transfer coating 52 melts and adheres to materials to which it is pressed against, such as fabrics, leather, wood and other materials or other articles which are not conveniently printed by conventional techniques.

FIG. 12 shows an image 54 printed onto the printable heat transfer coating 52 of FIG. 11. Generally, the image 54 printed onto the print coating is a mirror image of the image which will be formed in the final substrate 30. One of ordinary skill in the art would be able to produce and print such a mirror image using any one of many commercially available software picture/design programs. Due to the vast availability of these printing processes, nearly every consumer easily can produce his or her own image to make a customized textured image on a substrate.

FIGS. 13 and 14 sequentially depict transfer of the image 54 and the printable heat transfer coating 52 to a substrate 30. The printable heat transfer coating 52 is meltable in order to adhere to the final substrate 30 after applying it with heat and pressure. Such print coatings can be fashioned to be printable via, for example, laser printing and ink jet printing.

Such heat transfer papers are designed to be "cold peelable", which means that the paper can be removed after the substrate and paper are cooled. These heat transfer papers are well known to those skilled in the art. See, for example, U.S. Pat. Nos. 4,863,781, 6,033,739, 6,113,725 and 6,450,633. The present invention extends this technology further by providing durable, heat resistant release coatings 16 which release a wide variety of polymers including acrylic polymers and polyurethanes; yet, due to the relatively high critical surface tension of the cured coatings, can be coated with printable heat transfer coating 52 having surface tensions lower than about 32 dynes per centimeter. For example, the release coatings 16 can be printed with solvent borne coatings in solvents having surface tensions below about 32 dynes per centimeter or with water based coatings having surfactants which reduce the surface tension of the coatings to less than about 32 dynes per centimeter. Thus, heat transferred images on substrates 30 such as fabric and leather which possess desired properties offered by acrylic and polyurethane polymers such as stretch-ability, softness and durability can be created.

VI. Erasable Materials

The release substrate of FIG. 1 can be adapted to serve as an erasable material, such as an erasable poster board, erasable tablet, erasable coloring book and a portion of an erasable game. In this use, inks with surface tensions below about 32 dynes per centimeter can be used to apply images which retain their shape due to the relatively high critical surface tension of the coated substrate; yet, most inks can be easily erased due to the release and durability properties of the release coating. Substrates such as films and papers can be adapted to the desired use. Examples include thin paper substrates for tablets, heavy paper boards for posters and tacky films for adhesion of the erasable films to walls. For some uses, including coloring books and game boards, a non-erasable image as a background image which remains after each erasure is needed.

Several methods of applying such background images may be used. One example is the printed erasable substrate depicted in FIG. 15; in which the substrate 12 is printed with a background image 41, and then the release coating 16 is applied over the printing. The image 41 can define, for some examples, an image for coloring, a game board, a maze, a "connect the dots" image etc. After use (coloring or marking) the coloring or marking can be erased repeatedly, giving a fresh start for further coloring, drawing or gaming. The printing 41 under the release coating 16 remains after erasing. It is understood that any type of printing which can be successfully used on a given substrate could be used in this adaptation, since the substrate is printed before release coating 16.

A second method of making the background printed erasable paper is depicted in FIG. 16, in which the image 41 is applied as a mirror image to one side of a translucent substrate 60 (e.g., a translucent film or paper) and the release coating 16 is applied to the opposite side. The image 41 can be viewed as a "right reading" image from the release coated side. As such, coloring, gaming marks etc. can be applied to the release coating 16 and erased repeatedly without affecting the printing on the other side. A convenient advantage to this construction is that the image 41 can be applied after the substrate 60 is release coated, as, for example, might be done if one wishes to create a game using hand drawing or a small printer.

A third method of applying durable printing to the erasable material is with dye sublimation transfer printing. In this method, the release coated substrate 18, as shown in FIG. 2, is pressed with heating to a paper which has been printed with a sublimable dye image. The sublimable dyes diffuse into the release coating 16 and, since the dyes are dissolved in the coating, they cannot be erased from the surface.

VII. Heat Activated protective Film.

In FIG. 17, the release coating 16 is disposed on one side of a meltable adhesive film 65 to form a protective film 64. Meltable adhesive films 65 are known to those skilled in the art of laminating and in the manufacture of adhesives. For example, Lenderink Technologies of Belmont, Mich. offers a variety of these films. FIG. 18 depicts application of the protective film 64 to a substrate 30 utilizing heat H and pressure P to adhere the release coating 16 to the substrate 30 via the meltable adhesive film 65 therebetween. The protective film 64 can thus protect the substrate 30, which can be cloth, leather, wood, wall panel, furniture items and many others. Since most inks, paints and adhesives can be easily removed from release coating 16, the substrates 30 are protected from graffiti, food stains, paint, inks etc.

Examples

The initial formulations for release coatings were mixed and then applied by hand to 8.5×11 inch sheets of Neenah Paper Duraform Label Stock using a #3 wire wound rod, which gives approximately 6 microns of coating. The coated sheets were attached to a carrier web and then cured on a pilot electron beam curing line at PCT Engineered Systems, LLC. The carrier web was a roll of woven fiberglass cloth. The dosage was 4.0 megarads at 150 kilovolts under a Nitrogen atmosphere with less than 200 parts per million of Oxygen. (A Nitrogen atmosphere is used to eliminate most of the Oxygen, which can inhibit cure in electron beam curing.) The release coating compositions are given in Table 1. Scotch 810 tape pull tests, Gorilla Tape pull tests and two part epoxy pull tests are given in table 2. For reference, Gorilla Tape, (from The Gorilla Glue Company, Cincinnati, Ohio) is much more aggressive (adheres more strongly) than Scotch 810 tape and the two part epoxy adhesive (Perma Poxy-5 minute epoxy from PermaTex) is even more aggressive. The Scotch 810 tape was applied by hand and then pulled off to subjectively judge the ease of release. The Gorilla Tape pulls were done in the same manner and all pulls were harder due to stronger tape adhesion. If some of the coating came off with the tape, the portion of coating removed from the paper was noted. The two part epoxy was mixed, applied in an area about the size of a nickel, allowed to cure for at least five minutes and removed by flexing the paper near an edge of the epoxy coating to loosen an edge, then holding the paper flat on a lab bench while the coating was pulled off. Then the percentage of coating removed from the coated area was estimated.

TABLE 1

Initial candidate release coating formulations.

| Ingredient (percent) | A | B | C | D | E | F | G | H | I | J | K | L |
|---|---|---|---|---|---|---|---|---|---|---|---|---|
| Ebecryl 3700-20T | 40 | 40 | 40 | 40 | 40 | 40 | 40 | 40 | 40 | 40 | 40 | 40 |
| TMPTA | 60 | 59.5 | 50 | 50 | 45 | | | | 40 | 50 | 45 | 40 |
| SR9003 | | | | | | 50 | 50 | 44.5 | | | | |
| SR335 | | | | | 5 | | | 5 | | | 5 | 20 |
| Byk 307 | | 0.5 | | | | | | 0.5 | | | | |

TABLE 1-continued

Initial candidate release coating formulations.

| Ingredient (percent) | A | B | C | D | E | F | G | H | I | J | K | L |
|---|---|---|---|---|---|---|---|---|---|---|---|---|
| Tego Rad 2500 | | | 10 | | | | 10 | | | | | |
| Tego Rad 2600 | | | | 10 | 10 | 10 | | | 10 | 20 | | |
| Tego Rad 2700 | | | | | | | | | | | 10 | 10 |

Notes on Raw Materials:
A. Ebecryl 3077-20T (Cytec) is an acrylated bisphenol A epoxy oligomer. The 20T designation means the oligomer is diluted with 20% TMPTA monomer.
B. TMPTA (cytec) is trimetholyl propane triacrylate.
C. SR9003 (Sartomer) is propoxylated neopentyl glycol diacrylate.
D. SR335 (Sartomer) is lauryl acrylate.
E. BYK 307 (Actega) is ethyoxylated or propoxylated polydimethyl siloxane.
F. Tego Rad 2500, 2600 and 2700 are acrylated silicones.

TABLE 2 tape and epoxy resin pull tests on release coated samples.

| | Scotch 810 Tape Release | Gorilla Tape Release | Two Part Epoxy Release |
|---|---|---|---|
| A | Tight Peel | Some Coating Removal | Complete Coating Removal |
| B | Tight Peel | Some Coating Removal | Complete Coating Removal |
| C | Tight Peel | Some Coating Removal | Complete Coating Removal |
| D | Tight Peel | Almost No Coating Removal | Complete Coating Removal |
| E | Tight Peel | Almost No Coating Removal | 75% Coating Removal |
| F | Less Tight Peel | Almost No Coating Removal | 50% Coating Removal |
| G | Easy Peel | Almost No Coating Removal | 15% Coating Removal |
| H | Easy Peel | No To almost No Coating Removal | 10-20% Coating Removal |
| I | Tight Peel | Almost No Coating Removal | 50% Coating Removal |
| J | Easy Peel | Almost No Coating Removal | Complete Coating Removal |
| K | Easy Peel | No To almost No Coating Removal | 10-20% Coating Removal |
| L | Easy Peel | Some Coating removal | 10% Coating Removal |

The test samples A through L were tested for use as casting substrates for water based polyurethanes, acrylic latex and plasticized PVC latex and also, as forming substrates for PETG plastic. The results are summarized in Table 3. In this table, PUD is polyurethane dispersion. PUD 1 is Sancure 2710 from Noveon; PUD 2 is Witcobond W 296 from Chemtura; PUD 3 is Permax 230 from Noveon; PVC is Vycar 578, plasticized PVC from Noveon and "Acrylic" is Rhoplex B20, a soft acrylic latex from Rohm and Haas. "PETG" is a panel of PETG plastic. The coatings PUD 1, 2 and 3, the acrylic latex and the plasticized PVC latex were applied with a wire wound rod to give approximately 45 grams per square meter of coating and were dried in a forced air oven. In some cases, the water based coating did not wet the release coating well. This was corrected by adding 0.25 grams of Q2-5211, a silicone surfactant from Dow Corning, to the water based coating. After drying, the release of these coatings was tested by pressing the latex coated sample onto a piece of 100% cotton T shirt material in a heat press for 35 seconds at 375 degrees F., then removing the paper. Release was judged as being "good" if the coating separated cleanly from the release coating onto the cloth without removing any of the coating from the cloth and without removing any release coating from the paper. One sample rated as "marginal" gave successful transfers if the paper was removed carefully. One sample rated as "tight" gave a successful transfer but it was difficult to remove the paper.

For testing against a PETG panel, the release coated samples were pressed in a heat press for 5 minutes at 275 degrees F. and the paper was removed after cooling. Samples were judged as having good release if they peeled easily from the panel without leaving any coating on the panel. The sample rated as "marginal" left a small amount of coating on the panel.

TABLE 3

Release tests of the Initial samples A through L

| | PUD 1 | PUD 2 | PUD 3 | ACRYLIC | PVC | PETG |
|---|---|---|---|---|---|---|
| A | Not Good | Not Good | Not Good | Not Good | Marginal | Not Good |
| B | Not Good | Not Good | Not Good | Not Good | Good | Marginal |
| C | Not Good | Not Good | Not Good | Not Good | Good | Not Good |
| D | Not Good | Not Good | Not Good | Not Good | Good | Not Good |
| E | Not Good | Not Good | Not Good | Not Good | Good | Good |
| F | Not Good | Not Good | Not Good | Not Good | Good | Good |
| G | Not Good | Not Good | Not Good | Not Good | Good | Good |
| H | Not Good | Not Good | Not Good | Tight | Good | Good |
| I | Not Good | Not Good | Not Good | Not Good | Good | Good |
| J | Not Good | Not Good | Not Good | Not Good | Good | Not Good |
| K | Not Good | Not Good | Not Good ** | Good * | Good | Good |
| L | Good | Good | Good * | Good * | Good | Good |

* Poor Wetting
** Poor Wetting, OK with Surfacant added

The initial testing of the samples "A" through "L" indicated that, surprisingly, no silicone containing materials are needed (sample "L") to provide good release of a variety of materials, including polyurethanes, acrylics and PETG. More extensive testing of the "L" coating was carried out; specifically, it was tested on other substrates and it was tested for release of a variety of inks and paints. These tests reveal that it is a good candidate coating for erasable products and for graffiti resistant items. In addition, feasibility of application of coating "L" to a roll of material was demonstrated on a pilot scale coater.

Coating "L", described above, consisted of 40% Ebecryl 3700-20T, an epoxy acrylate; 40% Trimetholyl propane triacrylate and 20% SR 335, which is lauryl acrylate. The paper in this test run was "100 pound Sterling Ultra gloss Web Text", which is a two sided 'clay coated' publication grade available from New Page Corporation. The paper was coated at PCT on a pilot line equipped for flexo printing.

Sample #1—Initial tests were done using a 27 bcm anilox roll and a smooth rubber applicator roll with a speed ratio of one to one at a line speed of 50 feet per minute. Note, the bcm number of the anilox roll is a measure of the volume it can deliver, measured in billion cubic microns per inch. Also, it should be noted that the volume of coating will be reduced if the anilox roll is run slower than the transfer roll; the transfer roll being the roll which transfers the coating to the substrate.)

The cure was done in a Nitrogen flooded atmosphere with less than 200 ppm Oxygen. The current voltage was 150 kilovolts with the current at 20 miliamps, which gives a dosage of 4 megarads at a line speed of 50 feet per minute. The printed width was 17 inches. This gave a glossy, dry coating which had good release for tape and a Sharpie marker. The coating weight was 8 grams per square meter. The coating had a slight pattern thought to be from the anilox roll. Changing the roll speeds to run the anilox roll at 25% of the applicator roll speed gave a smoother coating with only a trace of streaks. The coating weight was 6 grams per square meter. Sample 1 was then produced at 50 feet per minute with this anilox/applicator condition, 150 kilovolts and 4 megarads (20 miliamp current).

Sample #2—A double coated version was made. The first coating was applied the same as sample 1 above, except that the dosage was reduced to 1 megarad (5 miliamps current). This was to improve spreading and adhesion of the second coating. The second coating was applied to the single coated paper using exactly the same conditions as sample 1. The combined coating weight was assumed to be approximately 12 grams per square meter.

The single coated paper, Sample 1 and the double coated paper, Sample 2, were tested with a black chisel point marker, a blue ballpoint pen and a Uni Paint oil based marker and these could be wiped off with a dry towel. Sharpie fine point permanent markers in eight colors; black, blue, green, yellow, orange, red, purple and brown were applied and let sit for 24 hours. They were all removed with a dry towel. Four black spray paints were applied to sheets of samples one and two. These were Valspar Plastic paint, Rust Oleum Gloss Protective Enamel, Rust Oleum Appliance Epoxy Enamel and Rust Oleum High Performance Flat Black Alkyd Enamel. After 24 hours, all these paints were removable. Light covered areas were removed by rubbing with isopropanol; heavier areas were removed with masking tape.

Samples one and two released easily from PETG panels after pressing for 5 minutes at 275 degrees F. The release of Rhoplex B 20, Sancure 2710, Witcobond W296, Permax 230 and Vycar 578 was tested the same as was done with the hand coated samples and they all released easily after coating onto the paper and pressing to a T shirt fabric, as described above. Rhoplex B 20 showed signs of poor spreading; this was corrected by adding 0.5 dry parts per 100 parts dry B 20, of Q2-5211, a wetting agent, to the Rhoplex B 20.

Samples one and two were tested for food staining by placing a few drops of the food on the paper, letting it sit for 24 hours, and then rubbing the spots off with a damp paper towel. All the food stains could be removed easily; including coffee, mayonnaise, soy sauce, mustard, red wine, pomegranate juice, vanilla extract, ketchup and olive oil. Lipstick was also easily removed after being on the paper for 24 hours.

Several additional materials were tested on Sample 1 to determine whether or not they could be removed. These included:
  Crayola Window Mega Markers (green, blue, pink, yellow)
  Crayola Washable Markers (raspberry, golden yellow, emerald, azure, copper, plum, primrose, teal)
  Crayola Classic Markers (yellow, brown, pink, gray, black, blue, green, orange, red, violet)
  Fibre-Craft Materials Corp. Foam Markers (green, pink, red, purple, black, blue)
  Horizon Group USA Face Paints (blue, yellow, red, green, black, white)
  Tulip Fabric Spray Paint (red, yellow, blue, green)
  Horizon Group USA Glass and Poster Marker (yellow)
  Wilton Color Mist Food Color Spray (green)
  Horizon Group USA Sparkly Glitter Glue (red)
  Cra-Z-Art Washable Watercolors (16 colors)
  Acrylic Paint (12 colors)
  Scribbles 3D Paint (Pacific Blue, Crystal)
  Uni Paint oil-base paint marker (black)
  Elmer's Painters paint marker (red)
All items were purchased and tested within one week.

Each item was applied to the sheet in a 1"×1" square (except fabric spray paint, glitter glue, and food color spray) and allowed to sit for a period of one hour, two hours, four hours, six hours, eight hours, and 24 hours.

The fabric spray paint, 3D paint, glitter glue, and food color spray were applied to the sheet and allowed to dry overnight.

All of these additional materials tested could be removed from the coating with a dry paper towel, with the exception of the fabric spray paints. Those were removed with isopropyl alcohol. The glitter glue and 3D paint could be peeled off in areas with thicker application, and rubbed away with a dry paper towel in thinner areas. However, the Elmer's paint marker discolored the sheet after only sitting for one hour.

Additional release coating formulations were L1, L2, L3, M, M1, N and O, as shown in Table 4. These coatings were applied to sheets of the 100 lb. Sterling Ultra Gloss paper which was used in the above pilot trials. A number 6 wire wound rod, which gives about 12 grams per square meter of coating, was used. The sheets were attached to a web and cured on a pilot line at a speed of 50 feet per minute in a Nitrogen atmosphere, with 4 megarads dosage and 150 Kilovolts. Samples L1 and L2 were clear before application. L3 was slightly cloudy. The SR 257, stearyl acrylate, is a waxy solid at room temperature and was heated to 60 degrees Centigrade before mixing. After cooling, the M and M1 coatings were cloudy. The N and O coatings were clear after cooling.

TABLE 4

Additional release coating formulations.

| Ingredient (percent) | L1 | L2 | L3 | M | M1 | N | O |
|---|---|---|---|---|---|---|---|
| Ebecryl 37-20T | 35 | 30 | 25 | 40 | 45 | 40 | 40 |
| TMPTA | 35 | 30 | 25 | 40 | 45 |  | 40 |
| SR9003 (propoxylated neopentyl diacrylate) |  |  |  |  |  | 40 |  |
| SR 257 (stearyl acrylate) |  |  |  | 20 | 10 | 20 | 10 |
| SR 335 (lauryl acrylate) | 30 | 40 | 50 |  |  |  | 10 |

All the samples of Table 4 were dry to the touch after curing. They were barely affected by 50 MEK double rubs. The Scotch 810 tape released easily from all the samples and Sharpie permanent marker writing was easily removable from them all. The Unipoint oil based marker released well from all the samples in Table 4 except sample M, which left a slight smudge. All of them released well after heat pressing from the water based coatings listed in Table 3 (PUD1, PUD2, PUD3, Acrylic and PVC). They also released well in the heat pressing test against the PETG panels at 275 degrees F.

Printed, Release Coated Erasable Paper:

Sheets of 100 Lb. Sterling Ultragloss Web Text from Newpage were laser printed with a grid pattern and also with a "Tic Tac Toe" game grid. These were then coated using a number 6 wire wound rod with formulation "L" above on the printed side. Curing was carried out as in the Table 1 description above after taping the samples to a web. The release coated sheets could then be marked with a Sharpie permanent marker and the marks were erased with a paper towel without any affect on the laser printing.

Printed, Release Coated, Translucent Erasable Paper:

Sheets of Neenah Paper 28 lb per 1300 square foot UV Ultra II were laser printed with a mirror image of a drawing for coloring. The printed sheets were then coated on the opposite side with a barrier layer of Rhoplex SP 100, (acrylic latex from Rohm and Haas), at 1.8 lb. per 1300 square feet after drying. The barrier coated sheets were then coated on the barrier coated side using a number 6 wire wound rod with the "L" formulation of Table 1. The sheets were taped to a web and cured as described in the Table 1 description. The release coated sheets could then be marked with a Sharpie permanent marker and erased with a paper towel.

Release Coated, Erasable Synthetic Paper.

Sheets of Kimdura FPG 110, a 110 micron thick polypropylene synthetic paper from Yupo Corporation, were coated with formulation "L" from Table 1, using a number 6 wire wound rod and then taped to a web and cured according to the Table 1 description. The coating adhered well and was markable and erasable with a Sharpie permanent marker.

Release Coatings with No Curable Resin.

The coatings in Table 5 were applied to Kimdura FPG 110 synthetic paper using a number 6 wire wound rod. They were then attached to a fiberglass cloth carrier web and then cured in a Nitrogen atmosphere as in the table 1 description. All the coatings were dry to the touch after curing and were written on with black, red, blue, purple, brown, yellow, green and orange Sharpie fine point permanent markers and with a black UniPoint oil based marker. After drying for about ten minutes, the marks were all removed by rubbing with a tissue. All the marks could be removed except for the red marker on sample "T", which left a faint stain. When coated samples R, S and T were tested with Scotch 810 tape, some of the coating came off the Kimdura so no further release tests were done.

TABLE 5

| Release coatings With No Curable resin | | | |
|---|---|---|---|
| Ingredient (percent) | R | S | T |
| TMPTA | 80 | 65 | 50 |
| Lauryl Acrylate | 20 | 35 | 50 |

Release Coated Adhesive Film.

Sheets of Neenah paper grade 9751P0, which have a peelable 1.8 mil thick film of an ethylene-acrylic acid/ethylene-methacrylic acid copolymer co-extrusion, were coated with formulation "L" (Table 1), as described in Table 1. The film with the "L" coating was peeled off the paper and then applied to samples of a 210 gram per square meter polyester cloth in a heat press for 25 seconds at 350 degrees F. This gave a glossy, conformal coating on the cloth which was resistant to a permanent marker stain. A sample of tanned cowhide was also coated in the same manner but the temperature was reduced to 300 degrees F. to avoid discoloration of the leather. This gave a glossy stain resistant coating on the cowhide.

AccuDyne Critical Surface Tension Test.

A sample of paper from the pilot run described above having the coating "L" of Table 1 Was tested with AccuDyne pens from Diversified Enterprises. The 30 dyne per centimeter pen wet the surface with no voids. The 32 dyne per centimeter pen wet well and voids slowly developed. Thus, the critical surface tension is about 32 dynes per centimeter.

Dye Sublimation Transfer Printing.

A colored image was printed with an Epson C86 color inkjet printer using Sawgrass Technology sublimation inks. The paper used was Neenah Paper 24#Classic Crest. The image was pressed against Sample 1 described above, from the pilot trial. This was done in a heat press at 375 degrees for 25 seconds. This gave a very vivid image on the Sample 1. There was no tendency for the papers to adhere when heated. The image could not be removed by rubbing with a paper towel.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A release sheet comprising:
    a base sheet having a first surface and a second surface; and
    a release coating directly on the first surface of the base sheet, wherein the release coating comprises a cured material formed from a formulation consisting of about 10% to about 25% by weight of a fatty alcohol ester of acrylic acid, about 30% to about 50% by weight of a curable polymeric resin, about 30% to about 50% by weight of trimethylolpropane triacrylate, and optionally an acrylated silicone, based on the total weight of the formulation
    wherein the release coating has a patterned release surface having a series of peaks and valleys to impart a texture, and wherein the curable polymeric resin is an epoxy acrylate polymer.

2. The release sheet as in claim 1, wherein the fatty alcohol ester of acrylic acid comprises lauryl acrylate.

3. The release sheet as in claim 1, wherein the release coating is substantially free from compounds having siloxane groups.

4. The release sheet as in claim 1, wherein the release coating has a thickness up to 150 microns.

5. The release sheet as in claim 1, wherein the release coating has a thickness about 1 µm to about 35 µm.

6. The release sheet as in claim 1, further comprising: a thermoplastic coating on the patterned release surface of the release coating.

7. The release sheet as in claim 1, wherein the fatty alcohol ester of acrylic acid is lauryl acrylate.

8. The release sheet as in claim 1, wherein the acrylated silicone is present in the formulation.

* * * * *